United States Patent [19]
Delcoigne et al.
[11] 4,383,960
[45] May 17, 1983

[54] PROCESS AND MECHANISM FOR THE ELIMINATION OF EXCESS WATER FROM A MIXTURE OF PLASTER AND WATER, AND THE PRODUCT OBTAINED

[76] Inventors: Adrien Delcoigne, 25 avenue Marie-Amelie, 60500 Chantilly; Jacques Lanneau, 24 Residence "La Belle Fontaine", 60600 Breuil Le Vert, both of France

[21] Appl. No.: 270,228

[22] Filed: Jun. 4, 1981

[30] Foreign Application Priority Data

Jun. 18, 1980 [FR] France ............ 80 13497

[51] Int. Cl.³ ............ B28B 1/26

[52] U.S. Cl. ............ 264/87; 264/234; 264/333; 264/348

[58] Field of Search ............ 264/87, 234, 333, 348

[56] References Cited

U.S. PATENT DOCUMENTS 4,067,939 1/1978 Lowe ............ 264/87
4,233,368 11/1980 Baehr ............ 264/333

*Primary Examiner*—John A. Parrish

[57] ABSTRACT

This invention is concerned with the plaster industry and, more precisely, with the elimination of excess water in objects containing hydratable calcium sulphate and water.

It offers to subject the said objects to a high efficiency thermic drying before the end of the hydration of the calcium sulphate, and to stop the said drying, while allowing enough water for the continuation of hydration to remain in the objects.

It is applied, more specifically, to the manufacture of plaster board.

20 Claims, 6 Drawing Figures

A
B
Drying
Filtration
Mechanical Drying
Vacuum
Vacuum
1
2
3
4
5
6
7
8
9
10
11
12
13
14

Enthalpy
Dry temperature
A
Pe
$\varphi = 0.9$
$\varphi = 1$
Absolute Humidity
H
T
150
100

Air entering : 0.0065 kg of water per kg at 15°C
Temperature of the air coming out
Humidity of the air coming out in kg of water vapor per kg of air
Energy expended
kcal/kg
1000
750
500
175°C
150
125
100
0,1
0,2
0,3
0,4
0,5
0,6
0,7
Water vapor pressure Temperature
°C
0
50
100
150
200
$CaSO_4$
$CaSO_4$ $1/2H_2O$
$CaSO_4$ $2H_2O$
mm mercury
3
2
1
0

PROCESS AND MECHANISM FOR THE ELIMINATION OF EXCESS WATER FROM A MIXTURE OF PLASTER AND WATER, AND THE PRODUCT OBTAINED

TECHNICAL FIELD

This invention is concerned with the plaster industry and, more precisely, with the elimination of excess water from an object such as a board containing hydratable calcium sulphate and water during the manufacture of the said object. We will deal, hereafter, more specifically, with an object having the shape of a board, but the invention is equally applicable to objects made entirely, mostly, or partially of plaster having other shapes.

CROSS-REFERENCES TO OTHER APPLICATIONS

This patent application is related to other applications which disclose a continuous system for making plasterboard and the like, the disclosures of which are incorporated herein by reference, including U.S. patent applications Ser. No. 3,414 filed Jan. 15, 1979 which shows a valve of a system for making plasterboard and the like, Ser. No. 3,416 filed Jan. 15, 1979 (now U.S. Pat. No. 4,257,710) which shows a mixer of the system, Ser. No. 3,415 filed Jan. 15, 1979 which shows a pouring head of the system, Ser. No. 118,099 filed Feb. 4, 1980 for U-shaped plasterboard and method, and Ser. No. 180,036 filed Aug. 21, 1980 for a device for pouring plaster.

BACKGROUND OF PRIOR ART

To manufacture an object from plaster, one mixes hydratable calcium sulphate ($CaSO_4$) with water, one shapes the object, the calcium sulphate is hydrated, is converted to double hydrate and simultaneously crystallized. In order to be able to shape the object, a quantity of water, greater than the quantity strictly necessary for the hydration of the $CaSO_4$ is often used, and after the shaping, this excess water must be eliminated.

It is a widespread practice to remove most of this water, before setting begins, by a mechanical process of the type: free flow, pressing, then waiting a certain amount of time for the plaster to set and for the hydration water to be used up, after which the object is subjected to a "thermic drying" for several hours in a "thermic dryer" in order to eliminate any free remaining water.

Standardly, the air to which the plaster objects are subjected in the dryers during the thermic drying is at a constant temperature, low, preferably less than 70° C. or an initially higher temperature (150° C.) but which is gradually lowered in such a way that the plaster remains below the temperature which would deteriorate the formed double hydrate.

Under these conditions, the drying time is long—several hours, even several days—because, on the one hand, the temperature is low and because, on the other hand, the excess water trapped in the mesh of $CaSO_4.2H_2O$ crystals is difficult to extract, resulting in heavy, important and costly installations.

Moreover, determining the optimal drying time and correct drying temperature for each stage is a delicate point, because of the risk of deterioration to the plaster. The heat acts on the surface of the product being dried and the temperature must be adjusted in such a way that there is always water at the surface. At the start of the drying there is indeed water at the surface, but afterwards the water at the heart of the product must have the time to move to the surface at the risk of damage to the outer portion of the plaster. The speed of elimination of the water is more important on the edges of the boards than anywhere else, whence the necessity to protect them with a screen for example, or to diminish the heat or the output of hot air reaching them in order to avoid damage to the plaster at the edges.

BRIEF SUMMARY OF THE INVENTION

This invention aims to remedy all of those drawbacks, namely the long drying time, the imperatively correct determining of the drying time and temperature, and the important, costly and complicated drying installations. In order to do that, it offers to subject the plaster-base objects to a thermic drying at a time when a large proportion of the rehydration water is still available in uncombined form.

The mesh of $CaSO_4.2H_2O$ crystals is not yet constituted and does not imprison the water which may thus easily be extracted, all the better extracted since it is present in large quantity because, contained in the product being dried, there is, not only the excess water, but the as yet unused rehydration water as well.

Under these conditions, we may, without deterioration of the product, institute a high efficiency thermic drying which may be stopped before the complete elimination of the water available in the product in such a way as to leave at least the water necessary to the total hydration of the plaster. We stop the thermic drying when there remains in the product, above and beyond the water necessary for hydration, only a maximum of 5% of excess water and generally only 1%.

We may elect to effect the drying with drying air at a high temperature and with a high coefficient of exchange between the plaster and the said drying air. It is beneficial to choose temperatures above 150° C. and generally on the order of 200° C.

It is beneficial, in order to shorten the thermic drying time, to have previously extracted some of the water by mechanical means such as depression or compression, just after shaping. Also, we may perform a filtration; the latter could be continued until a total volume of the plaster product, corresponding to that of the piled up grains of plaster, is obtained.

It is also beneficial to follow the filtration by a mechanical drying.

Each of these two preliminary operations, for one thing, eliminates the water; for another thing, acts upon the hydration kinetic of the gypsum either by accelerating the beginning of the reaction or, on the contrary, by slowing down the end of the reaction. Thus any water already eliminated during the course of this preliminary treatment will not have to be eliminated during the course of the thermic drying; we have at our disposal in a shorter time a product having enough hydrated phase to be manipulable and transferable to a thermic drying oven; we facilitate the extraction of water by thermic drying, slowing the formation of crystals which could impede its movement to the surface of the product, leaving a greater quantity of hydration water in the product; we stop the thermic drying sooner, leaving enough water in the product to finish the hydration which we have slowed down.

Instead of the filtration, or instead of the filtration and mechanical drying, or in combination with one or the other of these actions, we could reduce the time of the operations after shaping, by acting on the hydration kinetic of the gypsum using additives, for example by adding crystals of gypsum which accelerate the beginning of the crystallization.

The object which comes out of thermic drying then consists of a plaster which is not completely set, but which contains the water necessary to its continuation plus a quantity on the order of 1% of residual water. Moreover, because of the preliminary depression or compression treatment, the product is densified, its characteristics, particularly mechanical characteristics, and behavior with water are ameliorated.

The invention also offers a mechanism for instituting the process of elimination of excess water.

BRIEF DESCRIPTION OF THE DRAWINGS

It will now be described in detail with reference to the drawings which represent.

DETAILED DESCRIPTION OF THE INVENTION

Figure 1:
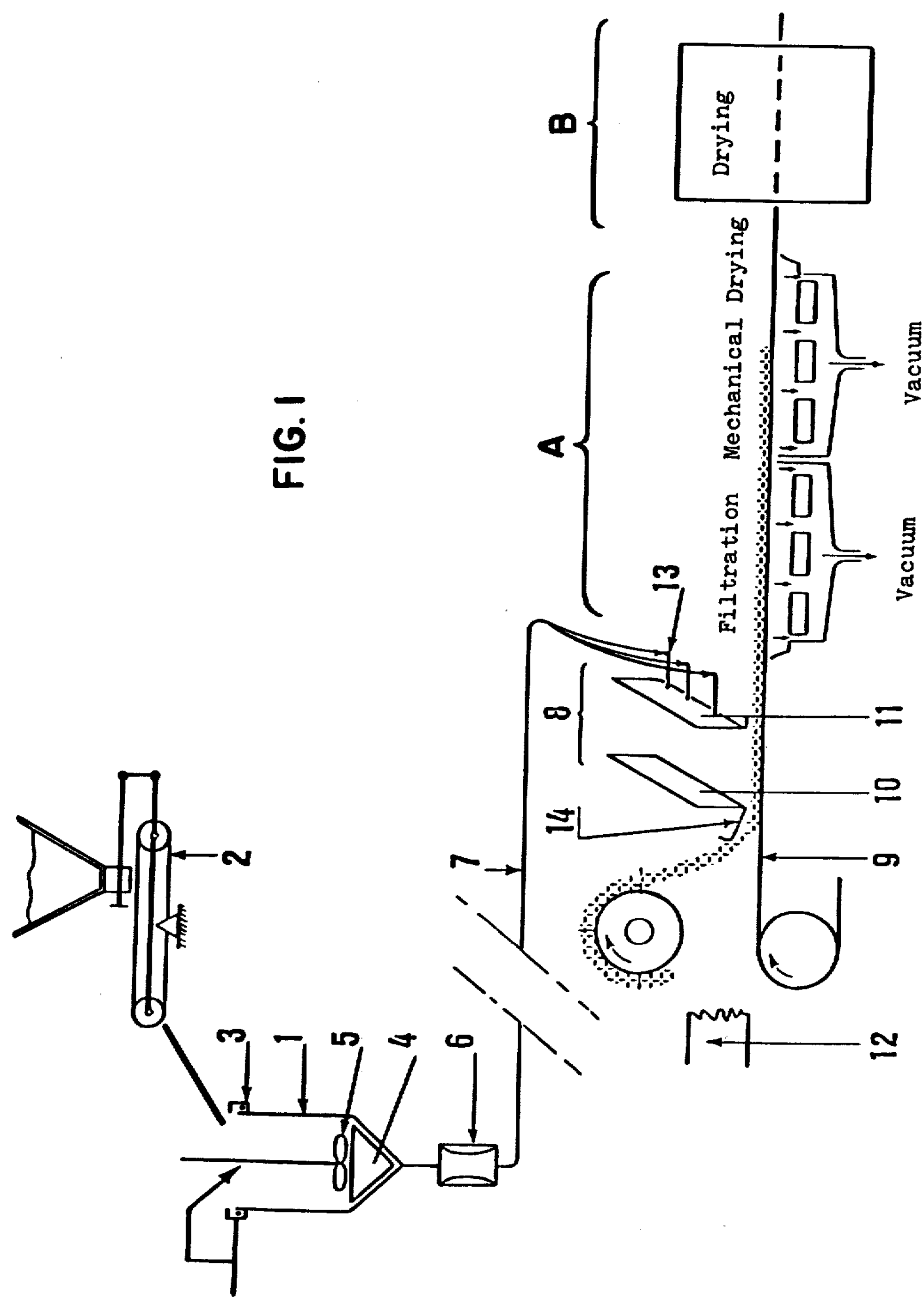
FIG. 1. a diagram of an installation for the manufacture of plaster board.

FIG. 1 shows a diagram of an installation for the manufacture of plaster objects; these objects being, for example, plaster board for use in construction.

The first station is the station for the mixing of one or several hydratable calcium sulphates ($CaSO_4$ and $CaSO_4.\frac{1}{2}H_2O$) with water and possibly with charges and/or reinforcing ingredients, additives which could modify the final product, such as accelerators, retarders, tensioactives, and liquifiers; or which could modify the final product, such as resins, foam, etc. Such a mixing station was described in detail in the French patent publication Nos. 2 417 134 and 2 416 717; (U.S. patent application No. 3,414 filed Jan. 15, 1979, and U.S. Pat. No. 4,257,710, respectively); it concerns a mixing container 1 which is cylindrical, fed with pulverized plaster and solid additives by a weight-sensitive conveyor 2 and with water and liquid additives by a covered ring-shaped pouring spout 3 which runs into the lateral wall of the container 1. That container 1 has an intermediate bottom 4 perforated at its periphery in order to let the mixture flow out, this intermediate bottom 4 being constituted by the upper part of a core, for example in the shape of a cone positioned with its flat base at the top, in an extension, itself conical, tapering from the bottom of the container 1. In the upper part of the mixing container 1, in close proximity to the intermediate bottom 4, revolves a deflocculating turbine 5. The flow leaving the mixing container 1 is regulated by a pneumatic valve 6 with a supple elastic sleeve, in such a way as to keep constant the quantity of products in the said container 1 as well as the mixing time. This elastic sleeve is moreover kept moving constantly in order to avoid the formation of deposits. The mixture is conducted by pipes 7 towards a second station which is the station where the plaster board is shaped. Such a station is described in detail in the French patent publication No. 2 416 777 (U.S. patent application No. 3,415 filed Jan. 15, 1979). It concerns a bottomless small trough 8, placed on a conveyor 9 formed by two plates 10 and 11 constituting the upstream and downstream partitions, as well as two lateral belts 12 moving at the same speed as the conveyor 9 and which contact the edges of the upstream and downstream plates 10, 11. A runoff opening is cut under the downstream plate 11; some of the plaster and water mixture is let into the small trough by way of the tubes 13 opening into the downstream plate 11 and streaming into the mass of the mixture which is initially in the small trough 8.

As shown in FIG. 1, the station where a ribbon or boards of plaster are manufactured may include means 14 of adding reinforcement materials, such as fiberglass in the form of rolls of fabric, of mat, of sheets of continuous enmeshed threads, of lattice-work or other forms.

Figure 2:
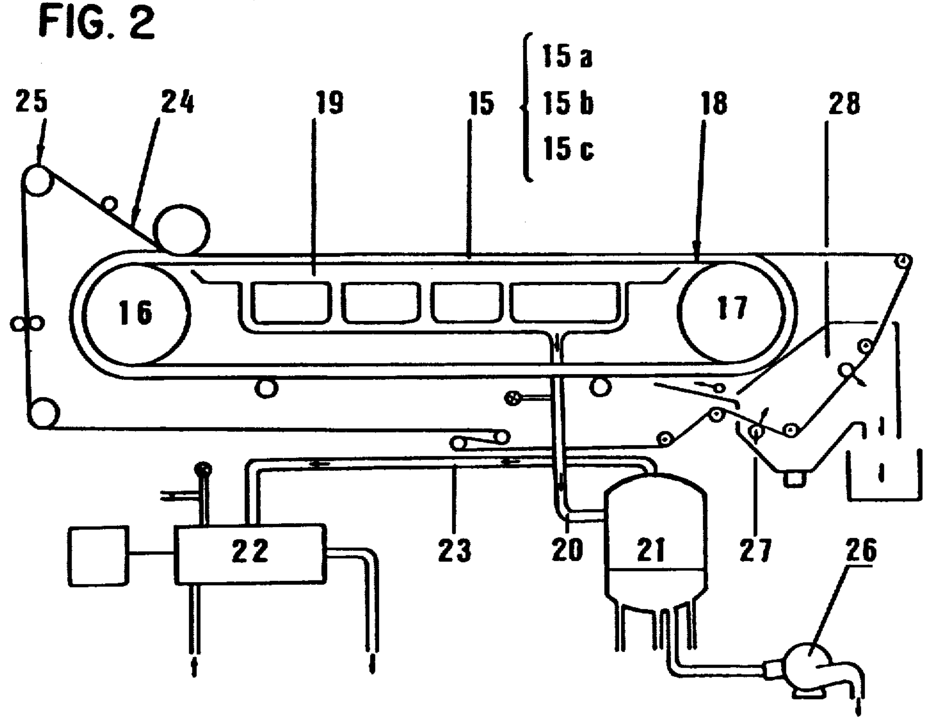
FIG. 2. an industrial filter.

The following station is where the excess water contained in the mixture is eliminated, that is to say, the water which is not needed for the hydration of the $CaSO_4.2H_2O$. According to the invention, the latter station includes mechanical A and thermic B means. The mechanical means A are placed right next to the shaping station. They are, for example constituted of an industrial filter shown in detail in FIG. 2, with which the operation of water elimination by suction is accomplished. It concerns a belt filter having a continuous filtration surface made of an endless belt 15, provided with evacuation holes, stretched between two revolving rollers 16 and 17, whose upper surface 18 slides over at least one suction caisson 19 communicating through one or several pipe systems with at least one evacuation chamber 21, itself connected to a vacuum station 22 by a pipe-line 23. The endless belt 15 is made of superimposed layers 15*a*, 15*b*, 15*c* . . . , of cloth or rubber, pierced with holes, having transversal ribbing on the uppermost layer 15*a*, the whole having a trough-shaped profile. The belt 15 is covered by an endless filtering support 24 for example made of cloth resting on the ribbings, moving at the same speed as the belt 15 and turning on guiding and driving rollers such as 25.

A pump 26, connected to the evacuation chamber 21, evacuates the water extracted from the plaster ribbon while it is being made; watering nozzles 27 are provided in order to clean the endless belt and the filtering support during their return trip. These watering nozzles 27 are inside a recuperation chamber 28 through which the filtering support crosses; some of them are also aimed at the belt 15 during its return trip, the chamber 28 recuperating the washing water.

The suction caisson 19 begins far enough from the downstream plate 11 of the small trough 8 for the flow of the water and plaster mixture so that the flow is not disturbed by the suction. Thus, a distance of 10 to 20 cm, when the vacuum or depression is on the order of 100 mm of Hg, is quite ample.

In the example described, the industrial filter A measures about 3 meters; it has two separate suction caissons 19, each one connected to its own means of vacuum production, and it allows first the performance of the filtration operation, that is to say, the extraction of the water continued until the grains of plaster touch one another, then the mechanical drying operation which consists of emptying the intergranular space of its water.

Figure 3:
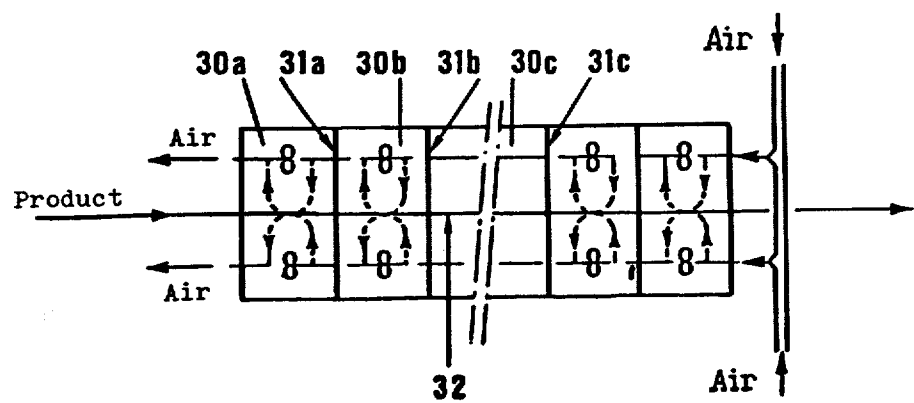
FIG. 3. a dryer.

In the example described, the filter is closely followed by thermic drying means B, under the circumstances, a continuous industrial dryer shown in FIG. 3. This dryer includes a plurality of cells 30*a*, 30*b*, 30*c* . . .

separated by opening partitions 31*a*, 31*b*, 31*c* . . . ; a conveyor belt 32 crosses the various upstream and downstream cells. Each cell has its own means of heating which can be gas burners for example. In each cell, the calorific exchange between the dryer and the product is obtained using two strong flowing air currents, one above and the other below the product, revolving the blowing onto the product boards, with impact, at high speed. The temperature of this air is regulated. What is more, an air current with a much weaker flow than the above traverses the group of the downstream and upstream cells, in countercurrent to the advance of the manufactured plaster board. The force of this flow is adjusted by regulating the humidity of the air coming out of the dryer. Usually in such a high performance dryer, in order to obtain the desired drying conditions, it suffices to regulate, for one thing, the dry temperature of the air entering each cell by controlling the means of heating and to regulate, for another, the humidity of the air coming out, in order to control the flow of air going through the dryer.

In other situations, the filter A may be short, 1 m approximately, and/or a certain length of the conveyor may be placed between the filter A and the thermic dryer B.

This mechanism for manufacture of plaster board works in the following way. We select an equilibrium ratio of mixture water/plaster, Eo/Po, Eo and Po being respectively the mass flow of the water and the mass flow of the plaster. This ratio Eo/Po is preferably high—on the order of 0.80 to 0.90 in order to allow easy and rapid shaping.

The mixing mechanism is described in the French application mentioned above, published under the No. 2 416 777, (U.S. Pat. No. 4,257,710), permits a rapid mixture, in as short a time as 3 seconds and which is generally on the order of 20 seconds.

It issues a mixture of liquid having a constant liquidity in about 20 seconds, counted after the water and plaster are in contact with each other. As indicated in the application published under the No. 2 416 777 (U.S. Pat. No. 4,257,710), this mixture is transported by pipes 7 to the pouring mechanism 8. Because of the great liquidity, the transport is rapid. Then the mixture in the small trough 8 is poured onto the conveyor belt 9 which moves at a constant rate. We thus obtain a ribbon of plaster product of homogeneous quality in any cross section perpendicular to the direction of the movement of the conveyor belt, and identical from one section to another for a given regulation of the installation. A reinforcement may then be put in place.

Whereas for the whole first phase of manufacture, it is advantageous to use a lot of water in order to completely wet the plaster quickly, to mix well, to transport the mixture in the pipes, to flow freely and rapidly, to facilitate the placing of the reinforcement, to only have to use a light weight material for the apparatus; on the contrary, then, as soon as the pouring is done, the presence of excess water is inconvenient. Indeed, the more the water, the longer the period of induction of the plaster before it begins to set, the greater the energy needed to eliminate that excess water, the longer the drying time, the more costly and important and heavy the equipment needed, the weaker the mechanical resistance of the products obtained.

Immediately after shaping, the poured ribbon of mixture arrives at the industrial filter A. The suction caisson 19 begins at a distance of 10 to 20 cms. from the downstream plate 11 of the small trough 8 in order to avoid the flow being disturbed by the applied vacuum. The vacuum is as strong as possible without entailing fissure. It is a function of the quality of the plaster used, of the thickness of the plaster ribbon, of the nature and quantity of the reinforcements used. During that phase, the percentage of water diminishes rapidly and leads asymptotically toward a percentage on the order of that of the mixture at saturation. The homogeneity of quality of the plaster is maintained in every cross section of the ribbon of product. The water being eliminated, the product densifies, the thickness of the ribbon diminishes, the bond between the reinforcing elements and the plaster becomes tighter and the grains of plaster come closer to one another until they touch. All water eliminated by filtration will not have to be eliminated later on by thermic drying, thus shortening the duration of the latter. We also facilitate the formation of gypsum crystals, which leads to an acceleration of the onset of the setting reaction of the plaster and a slight slowing down of the end of the said reaction. That permits us, on the one hand, to have at our disposal more rapidly a product which is sufficiently hydrated to be manipulable and transferable to the thermic drying oven, which then permits, once the product is in the drying oven, the slight slowing down of the hydration, thus facilitating the extraction of the water and ending that extraction of excess water more quickly, leaving a greater quantity of hydration water in the product.

During the course of that filtration, the water goes over the filtering support 24, is channeled into the furrows on the surface of the rubber layer 15*a* created by the ribbing, then flows out through the holes, while the grains of plaster are retained. For a ribbon of product with an initial thickness on the order of 10 mm, for example 8.5 mm, made of phosphoplaster having grains of an average thickness of 25 to 30 microns, the vacuum which may be applied without causing fissure is less than 150 mm of Hg, and in practice could range from 40 mm to 150 mm of mercury; the time for lowering the water to plaster ratio from the initial 0.80–0.90 to the water to plaster ratio of the mixture at saturation ranges from 80 seconds to several seconds.

A depression of 100 mm of Hg is standardly used; the filtration time is then 30 seconds and the zone where the water disappears from the surface of the ribbon of product is at 90 cm downstream on the downstream plate of the small pouring trough 8. The ratio between the thickness of the board or ribbon after pouring and its thickness after filtration is on the order of 1.35. The whole operation is finished in approximately the 120 to 150 seconds following the initial contact of the pulverized plaster and the water.

That sole operation of filtration may be accomplished on an industrial filter about 1 meter long. It leads to a reduction of the time of thermic drying. Then, the product may be moved on a conveyor to the thermic drying oven. During its passage, the set of the plaster develops, and the length of the conveyor is selected in such a way that, at its end, the product is sufficiently hydrated to be manipulable and to be transferable to the drying oven.

Preferably, we will seek to reduce the drying time even more by prolonging the filtration using mechanical drying. This mechanical drying is effected on the same belt 15 of the industrial filter A as the filtration. In this case the filter A is about 3 m long. The mechanical drying consists of another depression or vacuum in order to empty the space between the grains of plaster of its water. The depression or vacuum is done by a second vacuum suction caisson, separate from and independent of the one used for the filtration. There again, the depression or vacuum applied must remain less than that which would cause fissure. It is interesting to pursue that mechanical drying operation until the product attains a degree of hydration which renders it manipulable and until it contains from 20 to 50% of hydrated phase according to the nature of the plaster used.

For a ribbon of product of up to a thickness of about 10 mm, made of a phosphoplaster having grains with an average diameter of 25 to 30 microns, if we are to avoid fissure, the maximal permissible mechanical drying depression is on the order of 250 mm of Hg. The mechanical drying lasts about 1 minute.

The water extracted may be discarded or, in order to avoid any pollution, recycled and used along with fresh water.

At this stage of the filtering and mechanical drying, the rehydration of the $CaSO_4$, or what we call the setting, has barely begun, so that the direct recycling does not appreciably modify the evolution of the $CaSO_4$.

By mechanically drying, we stabilize the structure acquired by the filtration, we eliminate a bit more water which will not have to be extracted later by thermic drying, we accelerate even more the onset of the setting reaction of the plaster and thus bring about more quickly the moment when the product is transferable to the thermic drying oven; in compensation, we retard the end of the setting reaction of the plaster and thus we submit to thermic drying a product containing more water, we leave that water even freer to move to the surface of the product by retarding the formation of gypsum crystals which could obstruct the channels through which it moves and we can stop even sooner the thermic drying leaving in the product a greater quantity of water necessary for that hydration to continue until it is finished.

Thanks to the filtration and the mechanical drying we can progress from a ratio of water to plaster on the order of 0.80 upon exit from the shaping station, to a ratio of water to plaster on the order of 0.45 or 0.50 at the end of the industrial filter A, in about 2 minutes.

The filtration and the mechanical drying may be performed either on the top or on the bottom of the board. We may also have recourse, in combination with or instead of the above, to other means of extraction of the water such as compression of centrifuging.

If the mechanical drying is not continued until the product is manipulable, a portion of the conveyor may be provided, before arrival at the thermic dryer, in order to give the product enough time, during its passage on that portion, to be hydrated to the desired state. This may be the case when, the flow of water extracted having become too little, we stop the mechanical drying before having attained the state where the product is manipulable.

In place of the mechanical means of water elimination by suction, or in combination with these means, we can use additives in order to modulate the duration of the various stages of the setting of the plaster, and thus shorten the thermic drying time. Thus, immediately after shaping, we can seed the plaster with the crystallization germs which will accelerate the onset of the setting reaction of the plaster and which will then have an effect comparable to that of the filtration and the mechanical drying. For example, to the extent to which that other means will be used in combination with the filtration and possibly the mechanical drying, the germs could come from the filtrate recuperated which will have been channeled into an intermediary ripening basin in which we will let the dihydrate crystals develop or in which we will bring on their development.

As soon as the product is manipulable, it is transferred to the thermic dryer.

Whereas from the point of view of the speed of manufacture of a plaster board, it was advantageous first to pour quickly, using a mixture made very liquid by the addition of a large quantity of water, then, as soon as the shaping was done, to eliminate a maximum amount of water in order to accelerate the hydration of the $CaSO_4$; on the contrary, as soon as the product is manipulable, there is no longer any advantage to accelerating the hydration and, on the contrary, it is even extremely important that the hydration does not develop any longer or at least that it develop very slowly. The preliminary mechanical drying on the one hand, the high temperature in the dryer on the other, will contribute to slowing down the hydration. In the various compartments of the dryer, a current of hot air strikes the ribbon of product perpendicularly to its surface. The water extracted from the plaster is evacuated by the current of air which circulates in countercurrent.

We subject to the drying a hybrid product, that is to say, having a certain percentage of hydrated phase, that is at the onset of the drying a minimum of 20 to 50% according to the plaster used, unhydrated calcium sulphate and a large quantity of water. Thanks to the preliminary treatments of water extraction by suction, we have already removed a certain quantity of water, which will permit us to shorten the duration of the thermic drying. By these same preliminary treatments we can retard the end of the hydration reaction, which permits us to work with a product having a greater proportion of aqueous phase, thus to rapidly arrive at the moment when it is possible to stop the heating, leaving a greater quantity of water in the product, water which is necessary for the continuation of the hydration.

Under these conditions, we subject to thermic drying a product containing water which is extremely free, thus a product which will tolerate the most severe thermic conditions without risk. We can then begin a high efficiency drying without fear of deterioration of the product. Moreover, we can, using a control of the hydration rate, verify that the product is tolerating the high efficiency drying without damage. Indeed, for this thermic drying, the only constraints which we should respect are, first, the necessity to eliminate to within 5% all the excess water, and secondly, economic constraints.

All of these factors allow us to finish the drying in a remarkably short time. In order to determine the economic conditions for functioning of the dryer, several things must be decided: the temperature (T) of the air in the dryer, the humidity (H) of the air coming out of the dryer and the time of stay (s) of the product in the dryer. We know that upon entry, the plaster products must be manipulable, and upon exit, they should contain practically no excess water. Above and beyond the water which will be necessary for the hydration, we might possibly leave, upon exit from drying, a small supplementary percentage, less than 5% and preferably on the order of 1%, which corresponds to the water which the plaster absorbs in order to be in hygrothermic equilibrium with the surrounding air. It is moreover desirable that, during the thermic drying, the percentage of totally hydrated $CaSO_4$ does not regress.

Figure 4:
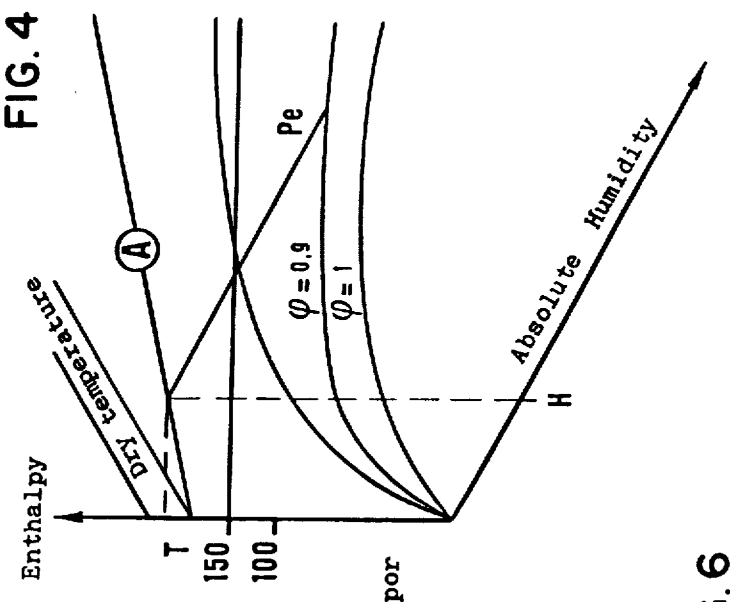
FIG. 4. a Mollier-Ramzine graph.

In order to determine these three parameters T, H, s, we can use the Mollier-Ramzine graph of the plaster (FIG. 4) on which we have especially drawn the isohumidity curve 0.9, that is to say, that which represents all of the airs which are in equilibrium with the plaster containing liquid water or at the retention limit of liquid water. With any given air A, the temperature T and the humidity H, the speed of drying is represented by the length of the segment $A_{(H,T)}$ Pe, Pe being the intersection point of the isohumidity curve 0.9 with the isenthalp passing through $A_{(H,T)}$. The shape of the isohumidity curves is such that, whatever A is, this segment will be longer, thus the speed greater, if T is great and if H is great starting at the point where T is greater than 150° C.

Figure 5:
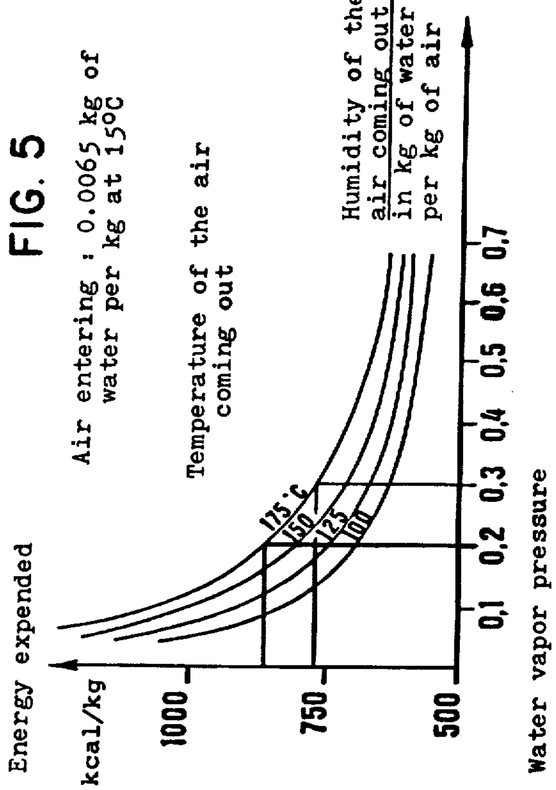
FIG. 5. enthalpic graph curves of the drying operation.

On the other hand, if we made the enthalpic graph of the thermic drying operation, we can represent using curves, the energy expended, in kg of vaporized water, in function of the percentage of humidity of the drying air coming out, for different air temperatures (FIG. 5), the entering air being an ambient air with an average temperature of 150° C. and at an average humidity of 0.0065 kg of water per kg we obtain a system of hyperbolas for which the more the air coming out is concentrated with water vapor, the less the energy expended, but also for which, when we consider the asymptotic region of these curves, that is to say, a humidity of at least 200 g and preferably higher than 300 g of water vapor per kg of dry air, the energy expended, whatever the circumstances, varies very little. Thus, it seems, when we compare the conclusions given by the Mollier-Ramzine graph and the curves of the enthalpic graph, that it would be advantageous, economically speaking on the one hand, and when we seek a high drying speed on the other, to choose for the dryer air a high temperature and a high exit humidity. In any case, the performances become interesting from the moment where T is higher than 150° C. and where H of the exiting air is higher than 200 g and preferably higher than 300 g of water vapor per kg of dry air and they will be even that much better if H and to a certain extent T are higher. There is however a limit which it is better not to go beyond, that is, where the dehydration of the already formed dihydrate prevails over the hydration of the $CaSO_4$ or the intermediate hydrate. Before the thermic drying, little time was needed to achieve the hydration rate permitting manipulation (less than 4 minutes); if, by removing the excess water in the dryer, we cause the hydration rate to regress, several days will then be necessary to regain the initial rate and to be able to manipulate the manufactured plaster board, given that all of the preliminary filtration and mechanical drying actions have led to the slowing down of the end of the setting reaction of the plaster.

We then watch over, using a control, the state of hydration of the plaster products which have come out of the dryer, so as not to choose an H and T combination for which the hydration rate upon exit will be less than the hydration rate upon entry. For example, in order to determine the hydration rate for a sample of semi-hydrate plaster product, we use the following method: we stop the hydration of the $CaSO_4$ using isopropyl alcohol, we let the sample dry in the drying oven at 60° C. for 24 to 48 hours (until constant point). We weigh it, we leave it at 400° C. for 3 hours. We weigh it again. Knowing the loss to the fire, we determine the sum (transformed hydrate+untransformed hydrate), and the weight at 60° C. permits us to determine the quantity transformed.

Figure 6:
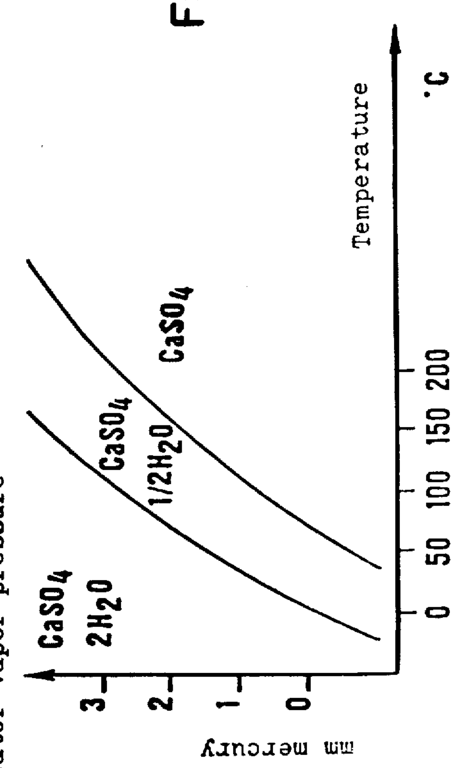
FIG. 6. the stability diagram for $CaSO_4.H_2O$ hydrates in the presence of humid air.

There is a limit which it seems necessary to consider when choosing H and T, that is the limit given by the stability graph of the various $CaSO_4.H_2O$ hydrates in the presence of humid air, established based on the thermodynamic constants. Such a graph, shown in FIG. 6, on which the temperature is the abscissa and the water vapor pressure or relative humidity is the ordinate, defines for $CaSO_4$ and its hydrates and boundaries of stability. The curves represented correspond to the equality of speed between the hydration from one body to another body which is more hydrated, to the one which is less hydrated. It seems then that in order not to have any regression of the hydration, the boards would have to be subjected to airs, the combination of whose characteristics (temperature, humidity) is above the curve defining the two stability boundaries for $CaSO_4.\frac{1}{2}H_2O$ and $CaSO_4.2H_2O$ or the limit on that curve. Indeed, these conclusions are only valid at equilibrium, when the time of stay under these conditions of humidity and temperature is long and where all of the product is in the form of dihydrate.

If the time of stay is short, less than ten minutes and preferably on the order of 3 to 4 minutes, even with an air at high temperature and low humidity, the dehydration is not perceptible even when hydration continues to the extent that the water is still available. That is the case when we subject to drying, not a plaster whose setting is completed, but a hybrid product whose setting is not finished and in which there are only a few crystals in an excess of water. Thus, if we leave a plaster board in the dryer at 200° C. and at a humidity of the air coming out of 50 g of water vapor per kg of air for 4 minutes, we note that if the said board was 55% hydrated upon entry, it is 80% hydrated upon exit. Thus even with the conditions of temperature and humidity which normally, in the case of totally hydrated plaster, would bring about the decomposition of the formed double hydrate into semi-hydrate, when the time of stay is short and there remains some uncombined free water, not only does the dehydration not occur, but what is more, the hydration continues. A fortiori, when, with that same temperature of 200° C., we choose more favorable conditions of humidity with regards to economy and rapidity of drying, that is to say, a humidity equal to 200 or even 300 g/kg of water we will not risk dehydration for short times of stay of about 4 minutes, and more generally, short times of less than 10 minutes.

With thin ribbons of product, in general less than 10 mm thick and preferably about 6 mm thick, we can choose, with even less risk of damage to the plaster, severe drying conditions, such as for example T=200° C. and H=300 g/kg.

Under those conditions we may achieve a high speed of drying on the order of 20 to 50 kg and on the average 25 kg of water vaporized per hour, per $m^2$ of exchange surface. The time of stay in the dryer is then on the order of 4 minutes.

In practice then, we will select a high efficiency dryer able to rapidly eliminate, that is to say, in about 4 minutes, as much water as the plaster contains of excess water.

For this dryer, we will adjust the conditions of functioning, i.e. temperature and humidity of the air coming out, in order to obtain a product containing not more than a maximum of 5% and preferably 1% of excess water upon exit. We will verify during the course of the thermic drying that there has been no regression of the hydration. It is beneficial to concentrate the humidity of the air coming out in order to have H higher than 200 g or even equal to 300 g of water vapor per kg of air, by limiting the flow of air.

The length of the dryer will be correct and the conditions of functioning economically advantageous if, in order to satisfy the imperatives of the drying, we can function at a temperature higher than 150° C. and preferably on the order of 200° C. and at a humidity higher than 200 g/kg and preferably on the order of 300 g/kg.

A ribbon of plaster manufactured as described above may be cut into boards as soon as it comes out of the dryer, then wrapped at once, it still contains, above and beyond a small quantity of excess water on the order of 1%, the water necessary to continue its hydration. Having entered the dryer with a great enough hydration rate to be manipulated (minimum of 20 to 50% according to the plaster used), dried under conditions which prevent regression of the hydration rate, it is thus still manipulable upon exit from the dryer, even though its hydration is not finished. Often, in spite of the high temperature, the hydration rate will have progressed slightly during the drying and, having entered with a minimum rate of 20 to 50%, the plaster product will come out of drying with a minimum hydration rate of 30 to 60% according to the plaster used. Thus its mechanical behavior will be that much better. We can consider that a product about 40 to 50% hydrated upon exit from the dryer, but containing the water necessary to continue its hydration, will be completely hydrated in 48 hours.

Thanks to the invention, it takes less than 10 minutes, from the moment when the water and pulverized plaster are placed in contact with one another, to manufacture and dry the plaster board, and to be able to use them, or to put it another way, less than 9 minutes and generally on the order of 7 minutes to eliminate the excess water.

The plaster ribbon can also be cut into plaster boards before entering the dryer.

Thanks to the preliminary filtration and mechanical drying treatments we obtain plaster products with better characteristics, particularly mechanical and behavior with regard to water.

Thus a sample of plaster board from which we have eliminated the excess water as described above only absorbs, when immersed in water at 20° C. for 48 hours, 13% of its initial dry mass.

A plaster board from which we have eliminated the excess water as described above has a SHORE C hardness of between 87 and 94 SHORE C units; while if it has not undergone the preliminary filtering and mechanical drying treatments, it has only a low SHORE C hardness on the order of 84 to 87.

By eliminating the excess water as described above, we multiply the specific mass of the product by about 1,35. The mechanical qualities, particularly the resistance to sagging, are clearly improved.

We claim:

1. Process for elimination of the excess water contained in continuous ribbons, obtained by shaping a mixture consisting essentially of hydratable calcium sulphate, water, required to hydrate said sulphate, and an excess of water beyond that required for total hydration of said sulphate, wherein the improvement comprises shaping a mixture essentially of hydratable calcium sulphate and water, and beginning thermic drying of said ribbon to completion of hydration of said sulphate, and continuing said thermic drying until said excess water is in the range of 1-5%.

2. Process as in claim 1, wherein the thermic drying is begun after the ribbons have attained sufficient hydration to give enough mechanical solidity to be manipulated.

3. Process as in claim 2, wherein the degree of hydration immediately before thermic drying is from 20 to 50%.

4. Process as in claim 2, wherein hydration is accelerated by extracting water until said ribbons become manipulable.

5. Process as in claim 2, wherein hydration is accelerated by addition of setting modulators until such ribbons become manipulable.

6. Process as in claim 4, wherein hydration is plowed down after mechanical solidity is attained by subjecting the ribbons to high temperature in a dryer.

7. Process as in claim 4, wherein prior to thermic drying, excess water is extracted from the ribbon by suction.

8. Process as in claim 7, wherein the suction uses vacuum pressures less than what would cause fissure said ribbons.

9. Process as in claim 1, wherein the thermic drying is preformed, above 150° C.

10. Process as in claim 9, wherein the thermic drying is performed in a dryer and the humidity of the air coming out of the dryer is higher that 200 g per kg of air.

11. Process as in claim 9, wherein the thermic drying time is approximately 10 minutes.

12. Process as in claim 9, wherein the drying time is about 4 minutes.

13. Process as in claim 9, wherein the degree of hydration during thermic drying remains approximately constant.

14. Process as in claim 13, wherein the degree of hydration upon exit from the thermic drying is 30 to 60%.

15. Process for elimination of excess water contained in continuous ribbons obtained by shaping a mixture of calcium sulphate and water with a water to sulphate mixture ratio higher than 0.80, having a thickness on the order of 10 mm, comprising filtering the ribbon for 20 to 80 seconds under a vacuum of 40 to 150 mm of mercury, subjecting the ribbon for about 1 minute to a vacuum on the order of 250 mm of mercury, letting hydration develop until said ribbon is manipulable, and thermic drying to extract from 20 to 50 kg of water vapor per hour per $m^2$ of exchange surface to eliminate at least 95% of the excess water.

16. Process of elimination of excess water contained in continuous ribbons, obtained by shaping a mixture of calcium sulphate water with a water to sulphate ratio on the order of 0.80 to 0.90, comprising filtering to densify and diminish the thickness of the ribbon subject the ribbon to another vacuum until a water to sulphate ratio on the order of 0.45 to 0.50 is reached, letting hydration develop until the ribbon is manipulable, putting said ribbon through thermic drying in a dryer at a temperature above 150° C. until elimination of 95% of the excess water, drying is regulated so that the air coming out of the dryer has a humidity of about 300 g of water vapor per kg of air.

17. Process as in claim 7, wherein the thermic drying is stopped before the ribbon has set.

18. Process as in claim 1 wherein the thermic drying is stopped before the ribbon is completely set, said ribbon containing enough water to finish hydration.

19. Process for elimination of excess water contained in a mixture of plaster and water, comprising first eliminating excess water by suction until the water to plaster ratio is on the order of 0.45 to 0.50 and the plaster is hydrated only to the value enabling manipulation, then thermic drying and preserving at least the degree of hydration already reached, and continuing the thermic drying eliminate 95% of the excess water to thereby leave only the water necessary to continue the hydration.

20. The process of claim 1 wherein the ribbons are cut into board after said ribbons have become manipulable but before the step of thermic drying.

* * * * *